United States Patent
Baer

(10) Patent No.: US 11,781,294 B2
(45) Date of Patent: Oct. 10, 2023

(54) WATER RECLAMATION SYSTEM FOR HOUSEHOLD USE HAVING A REMOVABLE SANITIZING MODULE

(71) Applicant: WHIRLPOOL CORPORATION, Benton Harbor, MI (US)

(72) Inventor: Robert R. Baer, Chicago, IL (US)

(73) Assignee: Whirlpool Corporation, Benton Harbor, MI (US)

(*) Notice: Subject to any disclaimer, the term of this patent is extended or adjusted under 35 U.S.C. 154(b) by 107 days.

(21) Appl. No.: 17/146,708

(22) Filed: Jan. 12, 2021

(65) Prior Publication Data

US 2022/0220711 A1     Jul. 14, 2022

(51) Int. Cl.
| | | |
|---|---|---|
| *E03B 1/04* | (2006.01) | |
| *C02F 1/32* | (2023.01) | |
| *C02F 1/78* | (2023.01) | |
| *C02F 1/52* | (2023.01) | |
| *C02F 103/00* | (2006.01) | |

(52) U.S. Cl.
CPC .............. *E03B 1/042* (2013.01); *C02F 1/32* (2013.01); *C02F 1/78* (2013.01); *C02F 1/52* (2013.01); *C02F 2103/002* (2013.01)

(58) Field of Classification Search
CPC ..... C02F 1/04; C02F 1/32; C02F 1/78; B01D 3/00
See application file for complete search history.

(56) References Cited

U.S. PATENT DOCUMENTS

| | | |
|---|---|---|
| 8,308,937 B2 | 11/2012 | Milani |
| 8,920,657 B2 | 12/2014 | Kawasaki |
| 9,790,100 B2 | 10/2017 | Schoendorfer |
| 10,173,912 B2 | 1/2019 | Upadhyay et al. |
| 2007/0090030 A1 | 4/2007 | Teran et al. |
| 2011/0083755 A1 | 4/2011 | Dolo Masnou |
| 2012/0228117 A1* | 9/2012 | Panunzio ................. C02F 9/00 203/10 |
| 2016/0016836 A1 | 1/2016 | Sudnick et al. |
| 2017/0145669 A1 | 3/2017 | Klicpera et al. |
| 2017/0297939 A1 | 10/2017 | Tseng et al. |
| 2018/0201516 A1 | 7/2018 | Mahdjoubi Namin |

FOREIGN PATENT DOCUMENTS

| | | |
|---|---|---|
| FR | 3053035 | 12/2017 |
| WO | 2020112002 | 6/2020 |

* cited by examiner

*Primary Examiner* — Walter D. Griffin
*Assistant Examiner* — Cameron J Allen
(74) *Attorney, Agent, or Firm* — Price Heneveld LLP

(57) ABSTRACT

A water reclamation system includes a collection basin that collects greywater from non-toilet sources. The collection basin is part of a fluid path of the greywater. A plurality of sensors are disposed within the fluid path. The plurality of sensors monitor a particulate level within the greywater. The plurality of sensors include at least a turbidity sensor and a conductivity sensor. A coagulation and filtration system separates particulate from the greywater to define filtered greywater. A staging basin is included, where the filtered greywater is delivered from the coagulation and filtration system to the staging basin to define flush water.

18 Claims, 6 Drawing Sheets

Method 400 for Reclaiming Greywater Using a Water Reclamation System

WATER RECLAMATION SYSTEM FOR HOUSEHOLD USE HAVING A REMOVABLE SANITIZING MODULE

BACKGROUND OF THE DISCLOSURE

The present disclosure generally relates to water reclamation systems, and more specifically, a greywater reclamation system for use in a household setting that uses a removable sanitizing module for creating non-potable water.

SUMMARY OF THE DISCLOSURE

According to one aspect of the present disclosure, a water reclamation system includes a collection basin that collects greywater from non-toilet sources. The collection basin is part of a fluid path of the greywater. A plurality of sensors are disposed within the fluid path. The plurality of sensors monitor a particulate level within the greywater. The plurality of sensors include at least a turbidity sensor and a conductivity sensor. A coagulation and filtration system separates particulate from the greywater to define filtered greywater. A staging basin is included, where the filtered greywater is delivered from the coagulation and filtration system to the staging basin to define flush water.

According to another aspect of the present disclosure, a water reclamation system includes a collection basin that collects greywater from non-toilet sources. A plurality of sensors are disposed within the collection basin. The sensors monitor a particulate level within the greywater. A coagulation and filtration system separates particulate from the greywater to define filtered greywater. A staging basin is configured to be coupled to a fixture to provide flush water to the fixture. A recirculation valve is positioned between the coagulation and filtration system and the staging basin. When the particulate level reaches a threshold particulate level, the recirculation valve selectively delivers the filtered greywater to a recirculation path and to the plurality of sensors. When the particulate level of the filtered greywater is below the threshold particulate level, the recirculation valve directs the filtered greywater to the staging basin.

According to yet another aspect of the present disclosure, a water reclamation system includes a collection basin that collects greywater from non-toilet sources, where the collection basin is part of a fluid path of the greywater. A plurality of sensors is disposed within the fluid path, where the plurality of sensors monitor a particulate level within the greywater, and where the plurality of sensors include at least a turbidity sensor and a conductivity sensor. A removable sanitizing module is received within a sanitizing receptacle of the fluid path. The sanitizing module includes at least a coagulator and a filter that define a coagulation and filtration system that separates particulate from the greywater to define filtered greywater. A staging basin is included, where the filtered greywater is delivered from the coagulation and filtration system to the staging basin to define flush water.

These and other features, advantages, and objects of the present disclosure will be further understood and appreciated by those skilled in the art by reference to the following specification, claims, and appended drawings.

Figure 1:
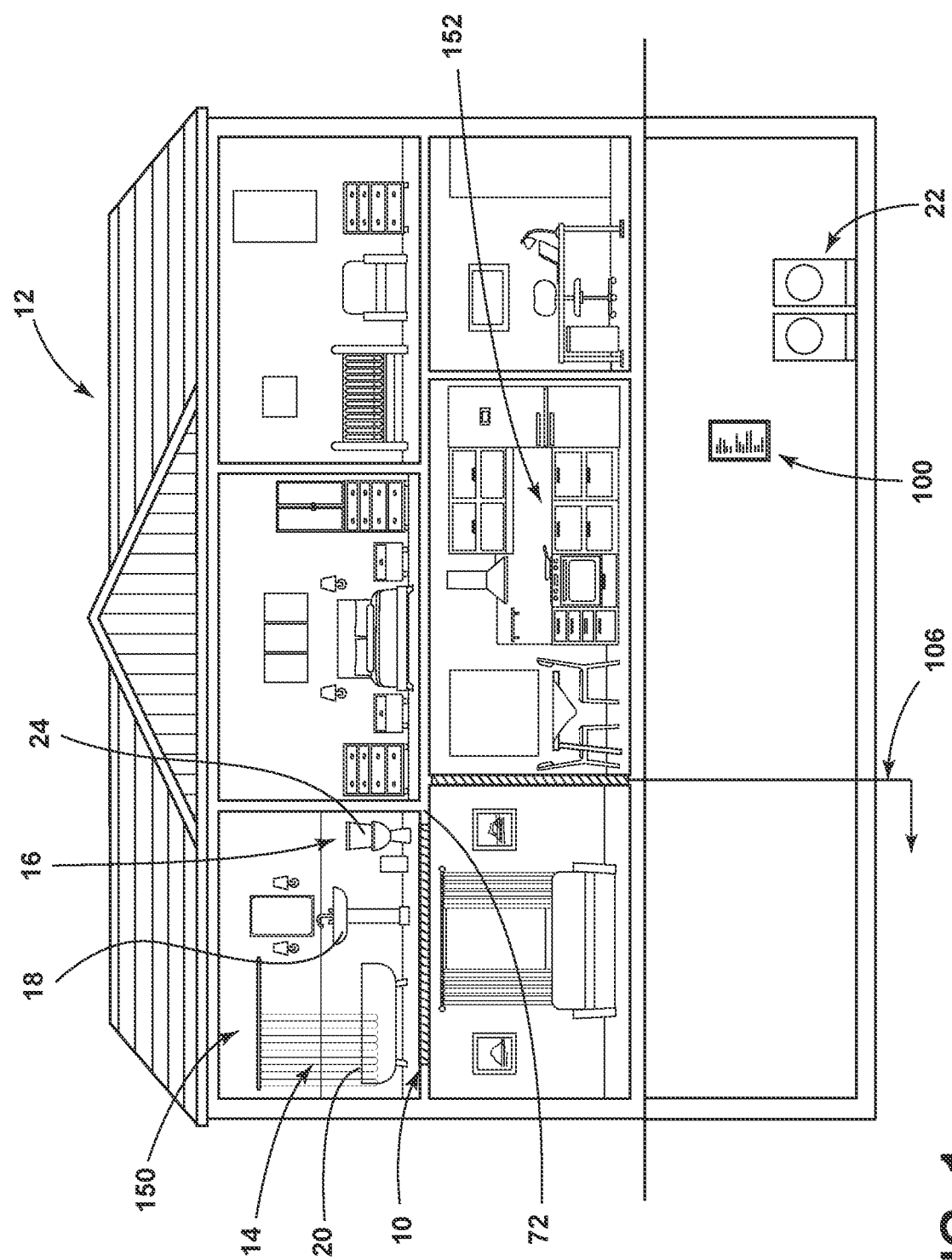
FIG. 1 is a schematic cross-sectional view of a household showing the locations of various fixtures in the house that can utilize an aspect of the water reclamation system.
Figure 2:
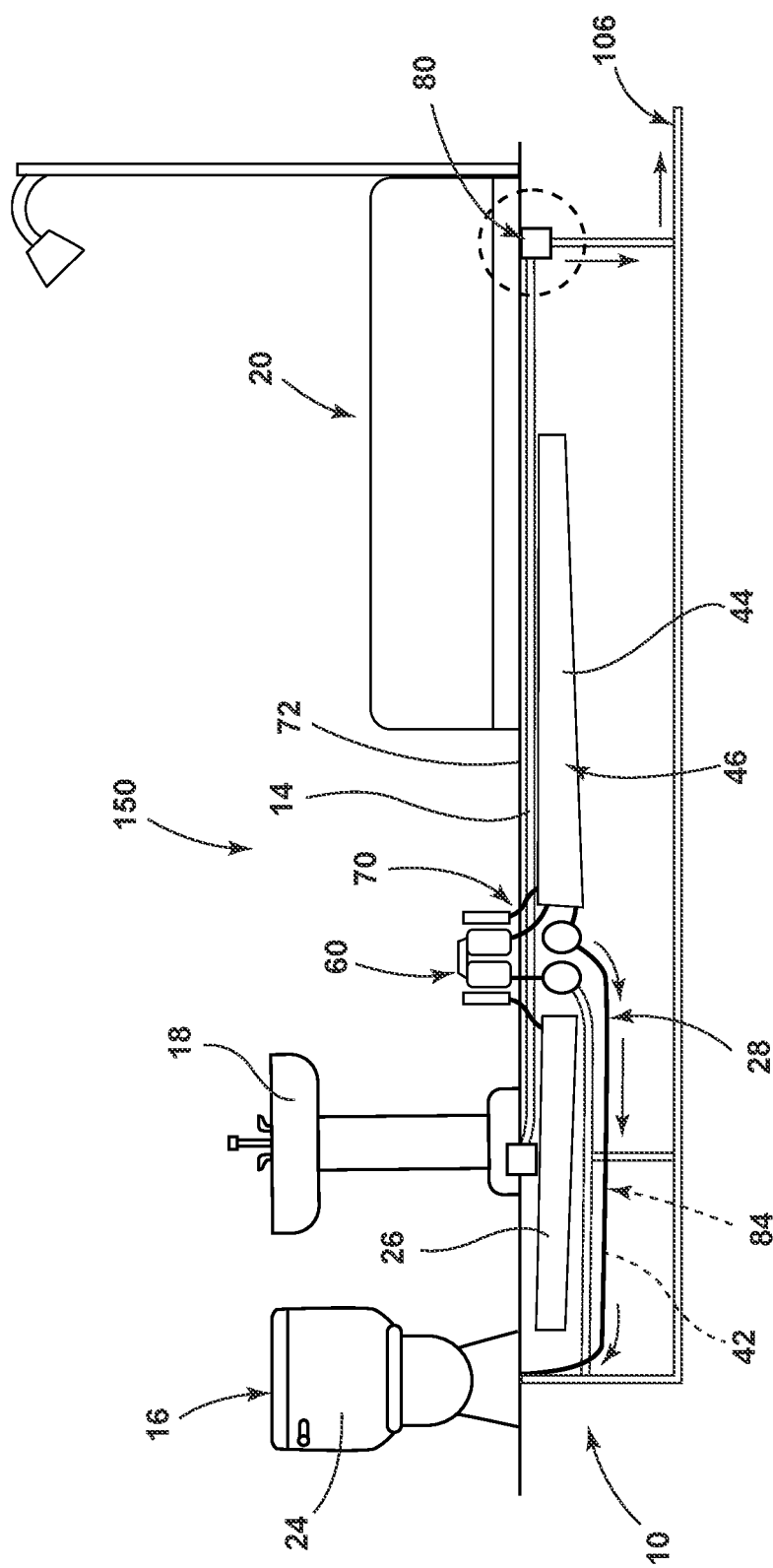
FIG. 2 is schematic diagram illustrating an aspect of the water reclamation system.
Figure 3:
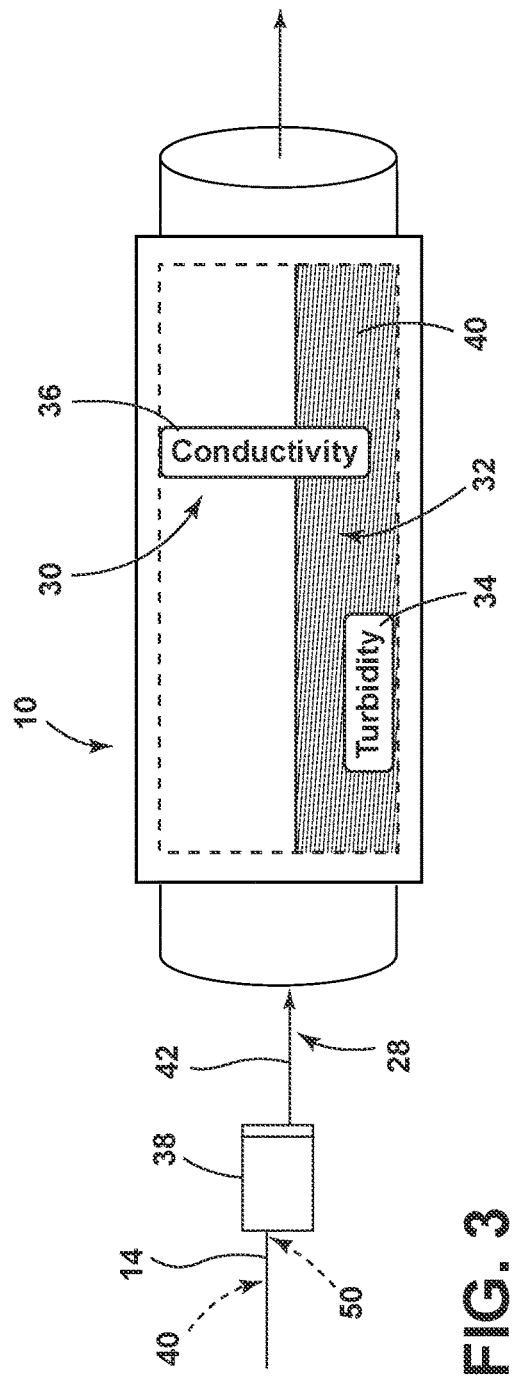
FIG. 3 is a schematic diagram illustrating an aspect of a collection basin for use in the water reclamation system.
Figure 4:
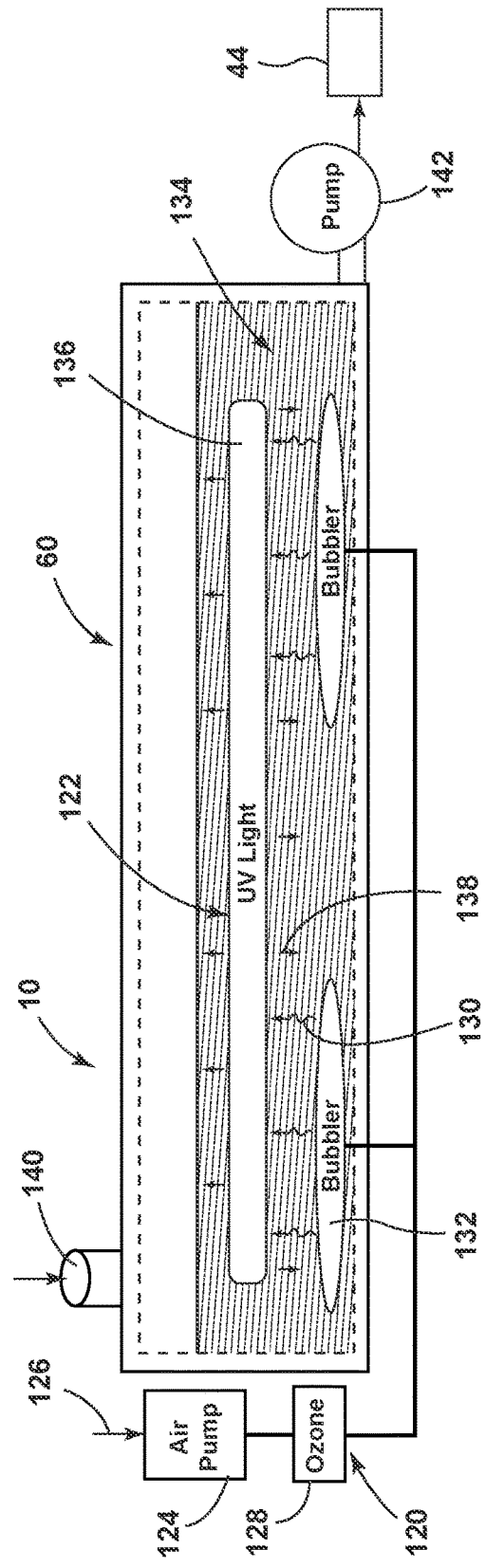
FIG. 4 is a schematic diagram illustrating an aspect of the collection basin for the water reclamation system that incorporates certain sanitizing features therein.
Figure 5:
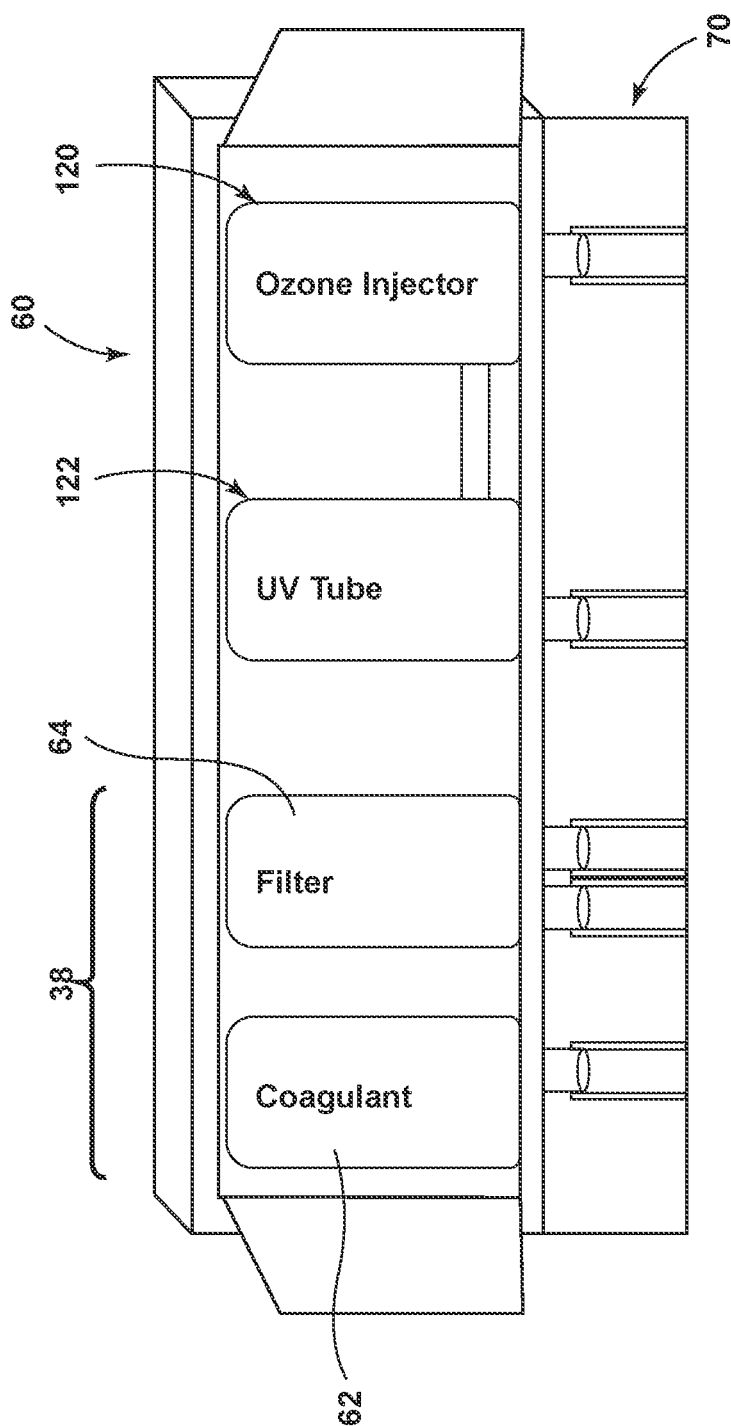
FIG. 5 is a schematic diagram illustrating an aspect of the sanitizing module that can be utilized within the water reclamation system.
Figure 6:
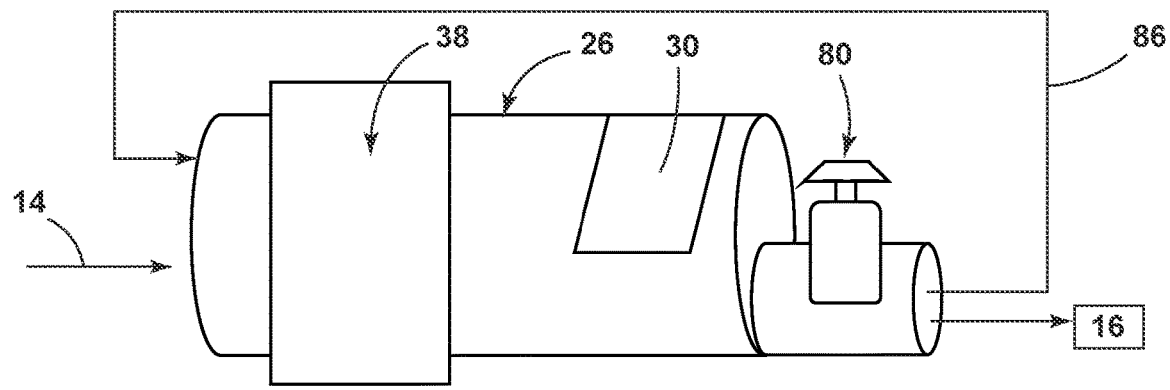
FIG. 6 is a schematic diagram illustrating an aspect of a recirculation valve that is used in connection with the water reclamation system for returning water back to the collection basin for retreatment.
Figure 7:
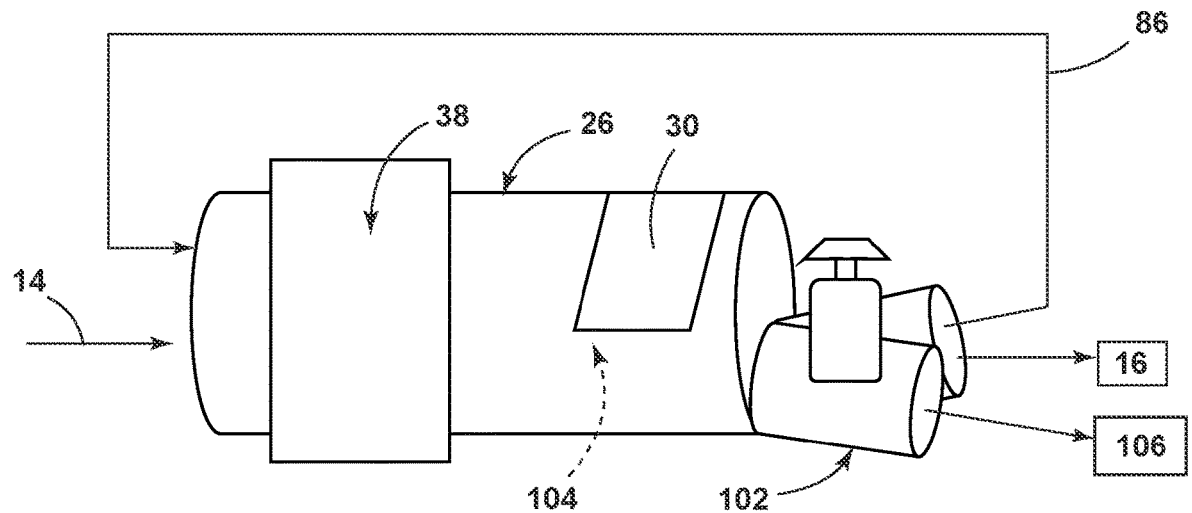
FIG. 7 is an aspect of the recirculation valve having multiple outlets for directing filtered greywater back to the collection basin or for moving the filtered greywater to an outlet.
Figure 8:
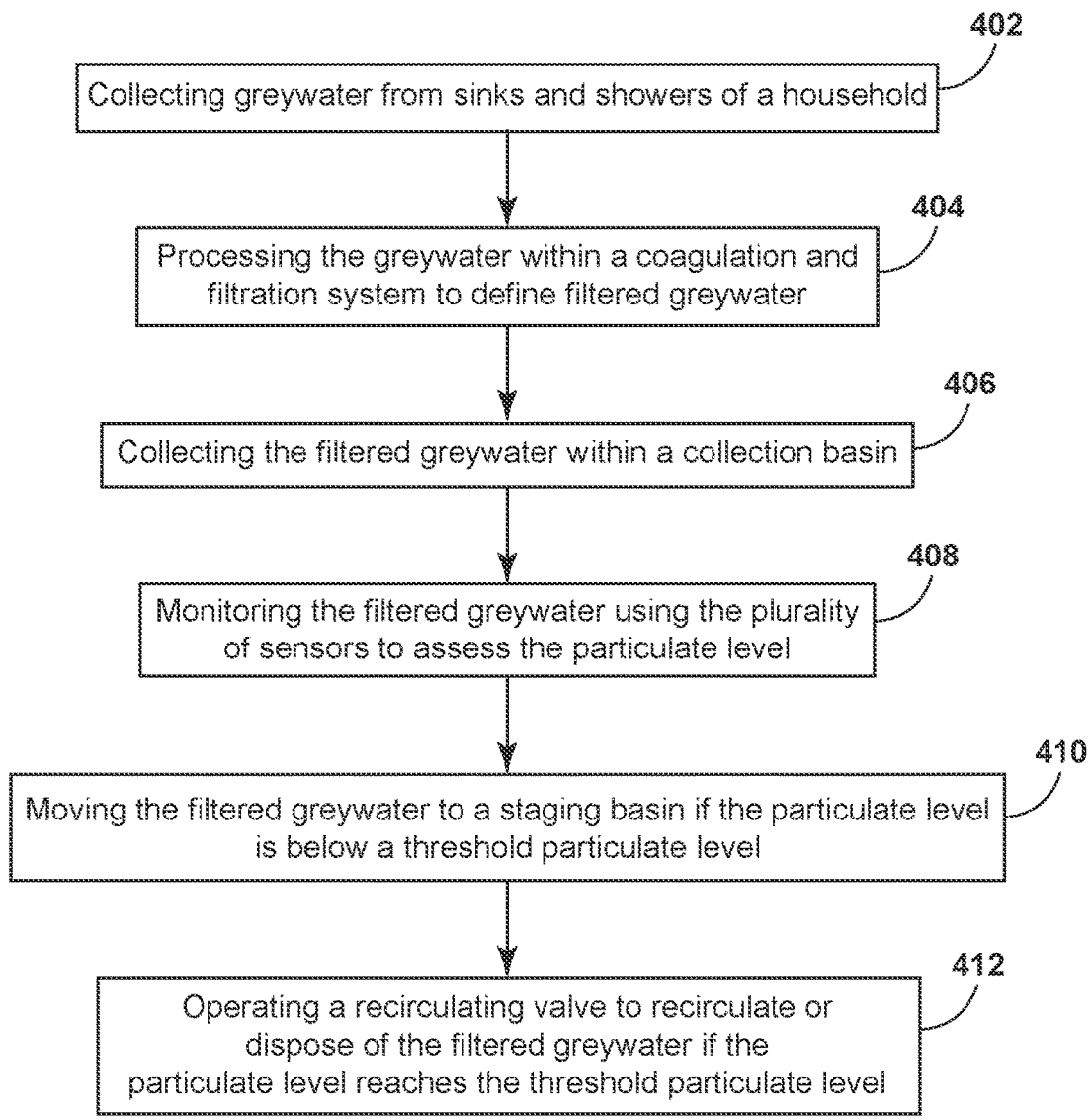
FIG. 8 is a linear flow diagram illustrating a method for treating greywater within a water reclamation system.

The components in the figures are not necessarily to scale, emphasis instead being placed upon illustrating the principles described herein.

DETAILED DESCRIPTION

The present illustrated embodiments reside primarily in combinations of method steps and apparatus components related to a water reclamation system for household use that includes a removable sanitizing module. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-5, reference numeral 10 generally designates a water reclamation system that can be utilized within a household 12 for filtering and treating greywater 14 for reuse within certain fixtures 16 within the household 12. The water reclamation system 10 receives greywater 14 from certain sources such as sinks 18, showers 20, and certain appliances 22, and treats this greywater 14 for use within certain fixtures 16, such as toilets 24 and water closets. This treated greywater 14 is reclaimed using the water reclamation system 10 and is not potable (not safe for consumption), but is able to be used within fixtures 16 for certain purposes, such as filling tanks within toilets 24 and water closets for flushing. According to various aspects of the device, the water reclamation system 10 includes a collection basin 26 that collects greywater 14 from fixtures 16 that are non-toilet sources of the greywater 14. The collection basin 26 is part of a fluid path 28 for moving the greywater 14 through the water reclamation system 10. A plurality of sensors 30 are disposed within the fluid path 28. The plurality of sensors 30 monitor a particulate level 32 within the greywater 14. The plurality of sensors 30 include at least a turbidity sensor 34 and a conductivity sensor 36. A coagulation and filtration system 38 is included in the water reclamation system 10 that separates particulate 40 from the greywater 14. Once moved through the coagulation and filtration system 38, the processed greywater 14 defines filtered greywater 42. In certain aspects of the device, the water reclamation system 10 also includes a staging basin 44, wherein the filtered greywater 42 is delivered from the coagulation and filtration system 38 to the staging basin 44. Once in the staging basin 44, the filtered greywater 42 defines flush water 46 that can be used within the various fixtures 16 within the household 12. It is contemplated that in certain aspects of the device, the collection basin 26 can also serve as the staging basin 44.

Referring again to FIGS. 1-5, the turbidity sensor 34 is used to measure a level of turbidity or an amount of particulate 40 within the greywater 14. This turbidity can also be characterized by a clarity of the greywater 14, or, where applicable, the filtered greywater 42. The more particulate 40 that exists within the greywater 14, the greater the turbidity and the greater the amount of particulate 40 that is suspended, flowing, or otherwise contained within the greywater 14. The conductivity sensor 36 can be used to measure the electrical conductivity of certain particulate 40 within the greywater 14. Various types of particulate 40 and other contaminants 50 inherently possess characteristics that include different levels of conductivity in relation to other particulate 40 and contaminants 50. The conductivity sensor 36 can be used to determine what types of contaminants 50 are contained within the particulate 40 of the greywater 14. Accordingly, the turbidity sensor 34 and the conductivity sensor 36 cooperate to measure not only the particulate level 32 within the greywater 14, but also the nature and types of particulate 40 that are within the greywater 14.

Referring again to FIGS. 2-5, the coagulation and filtration system 38 that is included within the water reclamation system 10 can be incorporated within various portions of the fluid path 28. Typically, the coagulation and filtration system 38 will be incorporated within a separate module, such as a sanitizing module 60, that at least partially cleans the greywater 14 either within the collection basin 26, or after leaving the collection basin 26, to form the filtered greywater 42. The sanitizing module 60 can include a coagulant 62 and filter member 64. The coagulant 62 causes the particulate 40 within the greywater 14 to accumulate into masses or clumps that can be more easily filtered using the filter member 64. In this manner, the greywater 14 can be cleaned to form the filtered greywater 42 that can be moved into the staging basin 44 for use as flush water 46. The staging basin 44 can also include a plurality of sensors 30 to continue monitoring the filtered greywater 42.

In certain aspects of the device, the coagulation and filtration system 38 can be attached to the collection basin 26 such that immediately after leaving the collection basin 26, the greywater 14 moves through the coagulation and filtration system 38. The coagulation and filtration system 38 can also be positioned upstream of the collection basin 26. In this aspect of the device, the greywater 14 can be processed within the coagulation and filtration system 38 before moving into the collection basin 26. It is also contemplated that the coagulation and filtration system 38 can be part of the sanitizing module 60 that can be a removable component that is received within a sanitizing receptacle 70 of the fluid path 28. This sanitizing receptacle 70 can be placed on a floor 72 or near a wall of the household 12. The sanitizing module 60 can be installed within the sanitizing receptacle 70. Over time, the sanitizing module 60 can be removed and replaced as the water reclamation system 10 is used over time. As will be discussed more fully below, the sanitizing module 60 can include additional components within the water reclamation system 10.

Referring now to FIGS. 2-6, the water reclamation system 10 can include a recirculation valve 80 that is positioned between the coagulation and filtration system 38 and the staging basin 44. When the particulate level 32 of the filtered greywater 42, including the level of contaminants 50 contained therein, reaches a threshold particulate level 84, the recirculation valve 80 selectively delivers the filtered greywater 42 to a recirculation path 86 to be reprocessed within the coagulation and filtration system 38 and then moved to the plurality of sensors 30 for a reevaluation of the filtered greywater 42. As discussed above, this filtered greywater 42 is processed within the coagulation and filtration system 38 before being evaluated by the plurality of sensors 30. When the particulate level 32 of the filtered greywater 42 is below the threshold particulate level 84, the recirculation valve 80 directs the filtered greywater 42 to the staging basin 44 for use as flush water 46. It is contemplated that the plurality of sensors 30 can be positioned within the collection basin 26 such that the recirculation valve 80 moves the filtered greywater 42 through the recirculation path 86 and back to the coagulation and filtration system 38 and then to the collection basin 26 to be reevaluated by the plurality of sensors 30. In certain aspects, it is contemplated that the plurality of sensors 30 can be positioned outside of the collection basin 26. In such an embodiment, the plurality of sensors 30 can be positioned within a narrower portion of the fluid path 28. In such an aspect of the device, the turbidity sensor 34 and the conductivity sensor 36 can be used to sense the greywater 14 or the filtered greywater 42 as it moves through a relatively confined space. In this manner, more of the greywater 14 and the filtered greywater 42 may be evaluated using the plurality of sensors 30 to obtain more real-time results from the plurality of sensors 30. Typically, the plurality of sensors 30 are located within the collection basin 26 and the greywater 14 therein is continually monitored using the plurality of sensors 30. Where the collection basin 26 also serves as the staging basin 44, the recirculation valve 80 can be used to direct the filtered greywater 42 through the recirculation path 86 or to the fixtures 16 for use as flush water 46.

In certain aspects of the device, as exemplified in FIGS. 2-7, the water reclamation system 10 can include a controller 100 that operates the recirculation valve 80 based upon the particulate level 32 of the greywater 14 and the filtered greywater 42. The plurality of sensors 30 and the controller 100 can cooperate to determine a particulate level 32 of the greywater 14 and the filtered greywater 42. Where the sensors 30 determine that the greywater 14 has a high level of contaminants 50, the controller 100 can determine that the greywater 14 defines an unusable state 104. When the unusable state 104 is determined, the controller 100 operates the recirculation valve 80 to an outlet position 102. In this outlet position 102, the recirculation valve 80 is configured to dispose of the greywater 14 through an outlet 106 so that it is expunged from the water reclamation system 10. Water having an extremely high level of contaminants 50, or certain contaminants 50 that may exceed the sanitizing capabilities of the coagulation and filtration system 38 and other sanitizing components of the water reclamation system 10, may be considered unusable and moved to the outlet 106.

In addition, where filtered greywater 42 is moved through the recirculation valve 80 and the coagulation and filtration system 38 a predetermined number of times, without being determined to being below the threshold particulate level 84, and without being moved to the staging basin 44, the controller 100 may prompt the recirculation valve 80 to move to the outlet position 102 to dispose of the filtered greywater 42 as being in an unusable state 104. In certain aspects of the device, this prompt may be accompanied by a communication to a user that the sanitizing module 60 may need to be replaced.

Where the sanitizing module 60 becomes saturated with particulate 40 and contaminants 50, it is possible that the effectiveness of the sanitizing module 60 and the components contained therein may lose their efficiency and effectiveness at removing contaminants 50 from the greywater 14. Accordingly, where the same batch of greywater 14 is moved through the recirculation valve 80 a certain number of times, a prompt may be communicated to the user to replace the sanitizing module 60 to return the system to its proper efficiency. The sanitizing module 60 can be a recyclable module or a disposable module.

Referring again to FIGS. 2-7, the sanitizing module 60 can also include additional components that add to the sanitizing capability of the water reclamation system 10. These components can include, but are not limited to, an ozone sanitizer 120 and an ultraviolet sanitizer 122. The ozone sanitizer 120 can include an air pump 124 that moves air 126 though an ozone generator 128. Ozone gas 130 ($O_3$) that is generated in the ozone generator 128 is moved to one or more bubblers 132 within a sanitizing chamber 134. The ozone gas 130 is typically an effective sanitizing gas that is useful at removing or separating certain contaminants 50 from fluid media, such as greywater 14. The ozone gas 130 is moved through the filtered greywater 42 for removing these contaminants 50. The sanitizing module 60 can also include an ultraviolet light generator 136 that can shine one or more wavelengths of ultraviolet light 138 through the filtered greywater 42 within the sanitizing chamber 134. Ultraviolet light 138 is effective at eliminating or neutralizing contaminants 50 within fluid media, such as greywater 14 and filtered greywater 42. The combination of the ozone sanitizer 120 and the ultraviolet sanitizer 122 can be used to remove or neutralize certain contaminants 50 from the greywater 14 and the filtered greywater 42 within the sanitizing chamber 134 of the sanitizing module 60. The sanitizing chamber 134 can include a fluid inlet 140 and a pump 142 that directs the filtered greywater 42 from the sanitizing chamber 134 to the next stage of the water reclamation system 10. This next stage can be in the form of supplemental sensors 30 that monitor the particulate level 32 within the filtered greywater 42. In addition, the greywater 14 can move from the sanitizing chamber 134 to the recirculation valve 80, or can be returned to the collection basin 26 for retreatment.

Referring again to FIGS. 2-7, it is typical that the ozone sanitizer 120 and the ultraviolet sanitizer 122 are contained within the sanitizing module 60. In certain aspects of the device, the water reclamation system 10 can include a plurality of sanitizing modules 60. In such an embodiment, one of the sanitizing modules 60 can include the coagulation and filtration system 38 that houses the coagulant 62 and the filter member 64 for removing particulate 40 from the greywater 14. Another separate sanitizing module 60 can include the ultraviolet sanitizer 122 and the ozone sanitizer 120. Typically, the coagulant 62 and the filter member 64 will be more frequently replaced than the ozone sanitizer 120 and the ultraviolet sanitizer 122. Accordingly, the two separate sanitizing modules 60, can contain different aspects of the water reclamation system 10 for treating greywater 14 over time.

Referring again to FIGS. 1-7, water reclamation system 10 includes the collection basin 26 that collects greywater 14 from fixtures 16 that make up non-toilet sources. The collection basin 26 is part of a fluid path 28 for moving the greywater 14 through the water reclamation system 10. The plurality of sensors 30, including a turbidity sensor 34 and a conductivity sensor 36 are disposed within the fluid path 28. The sensors 30 are used to monitor a particulate level 32 within the greywater 14. The water reclamation system 10 also includes the removable sanitizing module 60 that is received within the sanitizing receptacle 70 of the fluid path 28. The sanitizing module 60 includes at least the coagulant 62 and the filter member 64 that define the coagulation and filtration system 38. As discussed above, the coagulation and filtration system 38 is positioned upstream of the collection basin 26 and is used to separate particulate 40 from the greywater 14 to define filtered greywater 42. The staging basin 44 is positioned downstream of the removable sanitizing module 60 and the collection basin 26. The filtered greywater 42 is delivered from the coagulation and filtration system 38 and the collection basin 26 to the staging basin 44 to define flush water 46.

As discussed above, the water reclamation system 10 can also include a recirculation valve 80 that is positioned downstream of the coagulation and filtration system 38 and the collection basin 26. Typically the recirculation valve 80 is located between the coagulation and filtration system 38 and the staging basin 44. When the particulate level 32 of the filtered greywater 42 reaches a threshold particulate level 84, or exceeds this threshold particulate level 84, the recirculation valve 80 selectively delivers the filtered greywater 42 to a recirculation path 86 and back to the coagulation and filtration system 38 to be reprocessed and to the plurality of sensors 30 to be reevaluated. As discussed above, this may also include moving the filtered greywater 42 to the collection basin 26, which can house the plurality of sensors 30. After moving through the recirculation path 86, the filtered greywater 42 is retreated within the coagulation and filtration system 38. After being retreated, the filtered greywater 42 can be reassessed by the plurality of sensors 30. When the particulate level 32 of the filtered greywater 42 is below this threshold particulate level 84, indicating that the filtered greywater 42 is safe for use as flush water 46, the recirculation valve 80 directs the filtered greywater 42 to the staging basin 44 for use as flush water 46.

Using the water reclamation system 10, greywater 14 that may have a lower level of bacterial populations, such as water from sinks 18, showers 20, and certain appliances 22, can be reclaimed for reuse within certain components of the house. Such components typically include those that utilize flush water 46. It is also contemplated that this flush water 46 can be used exterior to the house in the form of irrigating water and other uses that are not for consumption of the reclaimed greywater 14. Using this reclaimed greywater 14, flush water 46 can be collected after use within the household 12 and reused within fixtures 16, such as toilets 24 and water closets contained within the household 12.

Typically, there is sufficient greywater 14 produced by sinks 18 and showers 20 that no additional outside sources of water may be needed for operating the toilets 24 and water closets of the household 12. As discussed above, certain greywater 14 from appliances 22 can also be reused within the water reclamation system 10. Such appliances 22 can include, but are not limited to, dishwashers, washing machines, and other similar appliances 22 that use water for treating certain articles within a household setting. Typically, the water reclamation system 10 will be installed within or under a bathroom 150 or kitchen 152 of a residence. In these locations, sufficient amounts of greywater 14 can be collected from the sinks 18 and showers 20 for use as flush water 46 within the toilets 24 contained within the bathrooms 150 of the household 12. It is contemplated that each bathroom 150 within the household 12 can include a dedicated water reclamation system 10. It is also contemplated that the various bathrooms 150 and kitchen 152 within the household 12 can be coupled to a single water reclamation system 10 for use throughout the day.

Referring now to FIGS. 1-8, having described the various aspects of the device, a method 400 is disclosed for reclaiming greywater 14 within a household 12 using an aspect of the water reclamation system 10. According to the method 400, greywater 14 is collected from sinks 18 and showers 20 (step 402). This greywater 14 is processed by being moved through the coagulation and filtration system 38 to define filtered greywater 42 (step 404). The filtered greywater 42 is then collected in the collection basin 26 (step 406). Within the collection basin 26, the filtered greywater 42 is monitored using the plurality of sensors 30 to assess the particulate level 32 of the filtered greywater 42 (step 408). If the filtered greywater 42 has a particulate level 32 below the threshold particulate level 84, it is moved to the staging basin 44 for use as flush water 46 (step 410). If the filtered greywater 42 has a particulate level 32 that is above the threshold particulate level 84, the recirculation valve 80 operates to either recirculate or dispose of the filtered greywater 42 (step 412).

It is common for only a portion of the toilets 24 and water closets to be used within a household 12 on a regular basis. Other toilets 24 and water closets may only be used by guests, or in certain periodic situations, such as a basement bathroom 150 or a bathroom 150 attached to a guestroom, and other similar situations.

Using the water reclamation system 10 disclosed herein, greywater 14 can be reused for non-potable purposes, such as flushing toilets 24 and water closets within the household 12. Using this reclaimed greywater 14, the amount of water used within a household 12 can be greatly diminished throughout the day and over larger periods of time.

According to another aspect of the present disclosure, a water reclamation system includes a collection basin that collects greywater from non-toilet sources. The collection basin is part of a fluid path of the greywater. A plurality of sensors are disposed within the fluid path. The plurality of sensors monitor a particulate level within the greywater. The plurality of sensors include at least a turbidity sensor and a conductivity sensor. A coagulation and filtration system separates particulate from the greywater to define filtered greywater. A staging basin is included, where the filtered greywater is delivered from the coagulation and filtration system to the staging basin to define flush water.

According to another aspect, a recirculation valve is positioned between the coagulation and filtration system and the staging basin. When the particulate level reaches a threshold particulate level, the recirculation valve selectively delivers the filtered greywater to a recirculation path and to the plurality of sensors. When the particulate level of the filtered greywater is below the threshold particulate level, the recirculation valve directs the filtered greywater to the staging basin.

According to yet another aspect, a sanitizing module is positioned within the recirculation path. The sanitizing module includes at least an ozone sanitizer and an ultraviolet sanitizer.

According to another aspect of the present disclosure, the sanitizing module also includes a coagulant and a filter of the coagulation and filtration system.

According to another aspect, the plurality of sensors are at least partially positioned within the collection basin.

According to yet another aspect, the sanitizing module is received within a sanitizing receptacle of the fluid path.

According to another aspect of the present disclosure, the sanitizing module is one of a disposable module and a recyclable module.

According to another aspect, a water reclamation system includes a collection basin that collects greywater from non-toilet sources. A plurality of sensors are disposed within the collection basin. The sensors monitor a particulate level within the greywater. A coagulation and filtration system separates particulate from the greywater to define filtered greywater. A staging basin is configured to be coupled to a fixture to provide flush water to the fixture. A recirculation valve is positioned between the coagulation and filtration system and the staging basin. When the particulate level reaches a threshold particulate level, the recirculation valve selectively delivers the filtered greywater to a recirculation path and to the plurality of sensors. When the particulate level of the filtered greywater is below the threshold particulate level, the recirculation valve directs the filtered greywater to the staging basin.

According to yet another aspect, a sanitizing module is positioned within the recirculation path.

According to another aspect of the present disclosure, the sanitizing module includes at least an ozone sanitizer.

According to another aspect, the sanitizing module includes an ultraviolet sanitizer.

According to yet another aspect, the sanitizing module includes a coagulator and a filter of the coagulation and filtration system.

According to another aspect of the present disclosure, the sanitizing module also includes an ozone sanitizer and an ultraviolet sanitizer.

According to another aspect, the plurality of sensors and the recirculation valve are coupled with a controller. The controller operates the recirculation valve based upon the particulate level of the greywater and the filtered greywater.

According to yet another aspect, the recirculation valve includes an outlet position.

When the plurality of sensors and the controller determine that the greywater defines an unusable state, the controller operates the recirculation valve to the outlet position that is configured to dispose of the greywater in the unusable state.

According to another aspect of the present disclosure, the plurality of sensors include at least a turbidity sensor and a conductivity sensor.

According to another aspect, a water reclamation system includes a collection basin that collects greywater from non-toilet sources, where the collection basin is part of a fluid path of the greywater. A plurality of sensors is disposed within the fluid path, where the plurality of sensors monitor a particulate level within the greywater, and where the plurality of sensors include at least a turbidity sensor and a conductivity sensor. A removable sanitizing module is received within a sanitizing receptacle of the fluid path. The sanitizing module includes at least a coagulator and a filter that define a coagulation and filtration system that separates particulate from the greywater to define filtered greywater. A staging basin is included, where the filtered greywater is delivered from the coagulation and filtration system to the staging basin to define flush water.

According to yet another aspect, a recirculation valve is positioned between the coagulation and filtration system and the staging basin. When the particulate level reaches a threshold particulate level, the recirculation valve selectively delivers the filtered greywater to a recirculation path and to the plurality of sensors. When the particulate level of the filtered greywater is below the threshold particulate level, the recirculation valve directs the filtered greywater to the staging basin.

According to another aspect of the present disclosure, the sanitizing module also includes at least an ozone sanitizer and an ultraviolet sanitizer.

According to another aspect, the plurality of sensors and the recirculation valve are coupled with a controller. The controller operates the recirculation valve based upon the particulate level of the greywater and the filtered greywater. The recirculation valve includes an outlet position. When the plurality of sensors and the controller determine that the greywater defines an unusable state, the controller operates the recirculation valve to the outlet position that is configured to dispose of the greywater in the unusable state.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A water reclamation system comprising:
   a collection basin that collects greywater from non-toilet sources, wherein the collection basin is part of a fluid path of the greywater;
   a plurality of sensors disposed within the fluid path, wherein the plurality of sensors monitor a particulate level within the greywater, wherein the plurality of sensors include at least a turbidity sensor and a conductivity sensor;
   a coagulation and filtration system that separates particulate from the greywater to define filtered greywater;
   a staging basin, wherein the filtered greywater is selectively delivered from the coagulation and filtration system to one of a recirculation path that recirculates the filtered greywater to the plurality of sensors and the staging basin to define flush water that is delivered to a toilet fixture via the fluid path; and
   a recirculation valve that is positioned between the coagulation and filtration system and the staging basin and that regulates delivery of filtered greywater from the coagulation and filtration system to the staging basin, wherein when the particulate level reaches a threshold particulate level the recirculation valve selectively delivers the filtered greywater to a recirculation path and to the plurality of sensors, and wherein when the particulate level of the filtered greywater is below the threshold particulate level the recirculation valve directs the filtered greywater to the staging basin, wherein the collection basin, the fluid path, the coagulation and filtration system, the recirculation path, the staging basin, and the recirculation valve are configured to be located within a residential structure proximate a residential bathroom.

2. The water reclamation system of claim 1, wherein a sanitizing module is positioned within the recirculation path and within the residential structure, and wherein the sanitizing module is a self-contained unit that includes at least an ozone sanitizer and an ultraviolet sanitizer.

3. The water reclamation system of claim 2, wherein the sanitizing module also includes a coagulant and a filter of the coagulation and filtration system.

4. The water reclamation system of claim 2, wherein the sanitizing module is received within a sanitizing receptacle of the fluid path.

5. The water reclamation system of claim 4, wherein the sanitizing module is a disposable module that can be removed from the sanitizing receptacle and replaced with a replacement sanitizing module.

6. The water reclamation system of claim 1, wherein the plurality of sensors are at least partially positioned within the collection basin.

7. A water reclamation system comprising:
   a collection basin that collects greywater from non-toilet sources;
   a plurality of sensors disposed within the collection basin, wherein the plurality of sensors monitor a particulate level within the greywater;
   a coagulation and filtration system that separates particulate from the greywater to define filtered greywater;
   a staging basin that is configured to be coupled to a toilet fixture, wherein the staging basin receives filtered greywater from the coagulation and filtration system to define flush water that is selectively provided to the toilet fixture; and
   a recirculation valve that is positioned between the coagulation and filtration system and the staging basin, wherein when the particulate level reaches a threshold particulate level, the recirculation valve selectively delivers the filtered greywater to a recirculation path and to the plurality of sensors, and wherein when the particulate level of the filtered greywater is below the threshold particulate level the recirculation valve directs the filtered greywater to the staging basin, wherein the collection basin, the coagulation and filtration system, the staging basin, the recirculation path, and the recirculation valve are a single unit that is configured to be located within a floor beneath a residential bathroom.

8. The water reclamation system of claim 7, wherein a sanitizing module is positioned within the recirculation path.

9. The water reclamation system of claim 8, wherein the sanitizing module includes a coagulator and a filter of the coagulation and filtration system.

10. The water reclamation system of claim 9, wherein the sanitizing module also includes an ozone sanitizer and an ultraviolet sanitizer.

11. The water reclamation system of claim 8, wherein the sanitizing module includes at least an ozone sanitizer.

12. The water reclamation system of claim 11, wherein the sanitizing module includes an ultraviolet sanitizer.

13. The water reclamation system of claim 7, wherein the plurality of sensors and the recirculation valve are coupled with a controller, wherein the controller operates the recirculation valve based upon the particulate level of the greywater and the filtered greywater.

14. The water reclamation system of claim 13, wherein the recirculation valve includes an outlet position, wherein when the plurality of sensors and the controller determine that the greywater defines an unusable state, the controller operates the recirculation valve to the outlet position that is configured to dispose of the greywater in the unusable state.

15. The water reclamation system of claim 7, wherein the plurality of sensors include at least a turbidity sensor and a conductivity sensor.

16. A water reclamation system comprising:
   a collection basin that collects greywater from non-toilet sources, wherein the collection basin is part of a fluid path of the greywater;
   a plurality of sensors disposed within the fluid path, wherein the plurality of sensors monitor a particulate level within the greywater, wherein the plurality of sensors include at least a turbidity sensor and a conductivity sensor;
   a removable sanitizing module that is received within a sanitizing receptacle of the fluid path, wherein the removable sanitizing module includes at least a coagulator and a filter disposed within a housing, wherein the removable sanitizing module defines a coagulation and filtration system that separates particulate from the greywater to define filtered greywater;
   a staging basin, wherein the filtered greywater is selectively received from the coagulation and filtration system to define flush water that is selectively delivered to a toilet fixture; and
   a recirculation valve that is positioned between the coagulation and filtration system and the staging basin, wherein when the particulate level reaches a threshold particulate level, the recirculation valve selectively delivers the filtered greywater to a recirculation path and to the plurality of sensors, and wherein when the particulate level of the filtered greywater is below the threshold particulate level, the recirculation valve directs the filtered greywater to the staging basin, wherein the collection basin, the fluid path, the sanitizing receptacle, the staging basin, the recirculation path, and the recirculation valve are configured to be disposed within a floor beneath a residential restroom.

17. The water reclamation system of claim 16, wherein the removable sanitizing module also includes at least an ozone sanitizer and an ultraviolet sanitizer.

18. The water reclamation system of claim 16, wherein the plurality of sensors and the recirculation valve are coupled with a controller, wherein the controller operates the recirculation valve based upon the particulate level of the greywater and the filtered greywater, and wherein the recirculation valve includes an outlet position, wherein when the plurality of sensors and the controller determine that the greywater defines an unusable state, the controller operates the recirculation valve to the outlet position that is configured to dispose of the greywater in the unusable state.

\* \* \* \* \*